US005455908A

United States Patent [19]
Ishida

[11] Patent Number: 5,455,908
[45] Date of Patent: Oct. 3, 1995

[54] ADDRESS FORMATION CIRCUIT AND METHHOD FOR CONTINUOUSLY PERFORING AN ADDRESS-BASED MEMORY ACCESS INTO A RECTANGULAR AREA

[75] Inventor: Hideo Ishida, Tokyo, Japan

[73] Assignee: NEC Corporation, Tokyo, Japan

[21] Appl. No.: 83,474

[22] Filed: Jun. 30, 1993

[30] Foreign Application Priority Data

Jul. 2, 1992 [JP] Japan ................................. 4-175113

[51] Int. Cl.$^6$ .................................................. G06F 12/06
[52] U.S. Cl. ........................................... 395/166; 395/162
[58] Field of Search ........................... 395/166, 400, 395/425, 162, 164; 348/714, 716, 719, 715, 718

[56] References Cited

U.S. PATENT DOCUMENTS

| | | | |
|---|---|---|---|
| 4,899,301 | 2/1990 | Nishitani et al. | 364/726 |
| 5,227,878 | 7/1993 | Puri et al. | 358/136 |
| 5,293,596 | 3/1994 | Toyokura et al. | 395/400 |
| 5,309,528 | 5/1994 | Rosen et al. | 352/58 |

FOREIGN PATENT DOCUMENTS

| | | |
|---|---|---|
| 0443551 | 8/1991 | European Pat. Off. |
| 2214038 | 8/1989 | United Kingdom. |
| WO92/03798 | 3/1992 | WIPO. |

OTHER PUBLICATIONS

Reader et al., "The IIP—An Interactive Image Processor", IEEE Computer Society Workshop on Computer Architecture for Pattern Analysis and Image Database Management, pp. 149–153 (Nov. 1981).

Haraski et al., Technical Research Report CAS86–225, Electronic Information & Communication Society of Japan, Mar. 1987.

*Primary Examiner*—Mark R. Powell
*Assistant Examiner*—U. Chauhan
*Attorney, Agent, or Firm*—Foley & Lardner

[57] ABSTRACT

In an address formation circuit for an image processing, an address formation is separately processed in parallel like a pipeline by first and second address calculation means. The first address calculation means controllable by a program calculates a head address of a macroblock, and the second address calculation means calculates addresses of pixels within the macroblock on the basis of the head address calculated by the first address calculation means. An instruction memory stores the program and a data memory and a data file memory store address moving amounts required the calculations. A sequence controller controls an exclusive hardware. Hence, a high speed memory access like a real time image processing in the address formation can be possible and, when a complicated address pattern is required, an overhead of the address formation time in the instruction processing can be prevented.

5 Claims, 8 Drawing Sheets

ADDRESS FORMATION CIRCUIT AND METHHOD FOR CONTINUOUSLY PERFORING AN ADDRESS-BASED MEMORY ACCESS INTO A RECTANGULAR AREA

BACKGROUND OF THE INVENTION

The present invention relates to an address formation circuit for continuously performing a memory access into a rectangular area and a method of generating the address.

DESCRIPTION OF THE RELATED ART

In an image coding and decoding algorithm such as a motion compensative interframe prediction, a discrete cosine transform (DCT) and the like, a rectangular area (8×8 pixels, 16×16 pixels) is one processing unit. In the MPEG (Moving Picture Experts Group) as the ISO standardizing active group, rectangular areas of 16×16 and 8×8 pixels are called a macroblock and a block, respectively.

In a usual image processing, it is necessary to allocate a pixel set spreading in a two-dimensional space to one-dimensional memory address space. In this case, a method of the one-dimensional memory address allocation in order of a raster scanning of the pixels is often performed. The continuous address formation of the rectangular area is a reading of address values in a pattern as shown in FIG. 1 on the assumption of such a one-dimensional memory address allocation.

As a conventional address formation method, three methods are known, that is, (1) a software method for forming the addresses by executing a program by using a general-purpose processor or digital signal processor (DSP), (2) a hardware method for forming the addresses by a special-purpose hardware of a circuit for controlling the aforementioned sequence and (3) a combined method of (1) and (2).

FIG. 2 illustrates a conventional software-hardware combined address formation circuit which is based on "Two-dimensional Address Formation LSI for Real Time Motion Image Video Signal Processor (VSP)" Technical Research Report CAS86-225, Electronic Information & Communication Society of Japan, March, 1987. An operation of executing an address formation in FIG. 2 will now be described in connection with FIG. 1.

In FIG. 1, assuming that an pixel A0 in the left top position is a head address, an address A1 is obtained by A0+$\Delta$x1. By adding $\Delta$x1, the address is moved to a right adjacent pixel. Next to A7, the address of B0 is obtained by adding $\Delta$x2. The addresses within a block (8×8) can be successively formed by adding the moving amounts $\Delta$x1 and $\Delta$x2. Also, the address of A8 can be obtained by adding an address moving amount $\Delta$x3 for moving from the right bottom position in the block from the left top position in an adjacent right block to H7. Similarly, when the address moving amounts as indicated in the following are known, the address values of the pixels can be consecutively formed.

$\Delta$x1 ... address moving amount to an adjacent right pixel within one block (8×8)

$\Delta$x2 ... address moving amount from the right end pixel to the left end pixel of one lower line within one block $\Delta$x3 ... address moving amount from the lowermost right end pixel of one block to the uppermost left end pixel of another adjacent block $\Delta$x4 ... address moving amount from the lowermost right end pixel of one block to the uppermost left end pixel of one lower and two left block The above-described moving patterns are the address formation procedures within one macroblock. Further, by successively adding the head address within the macroblock with a moving pattern of each macroblock, separately obtained, all addresses of the pixels over the whole area can be obtained. That is, by adding a moving amount $\Delta$x5 to the head address of an adjacent right macroblock to A0, the head address of the adjacent right macroblock is formed. Also, by successively adding the $\Delta$x5, the head address of the adjacent right macroblock can be obtained. Similarly, when the following moving amounts are known, the head addresses of the macroblocks can be consecutively calculated.

$\Delta$x5 ... address moving amount from the uppermost left end pixel within one macroblock to the uppermost left end pixel within another adjacent right macroblock $\Delta$x6 ... address moving amount from the uppermost left end pixel within the right end macroblock to the uppermost left end pixel within one lower macroblock line of the left end macroblock In FIG. 2, the address calculation of this address formation circuit is controlled by an instruction set of an attached host processor 120 including an instruction memory 121, a decoder 122 and an IR register 119 therebetween. An IY register 126 covers the formation of the addresses within the macroblocks and a BY register 125 covers the formation of the head addresses of the macroblocks. By the addition of both the registers 126 and 125, all the addresses over the entire area can be formed. By the instruction of the host processor 120, the head address of the macroblock, read out of a register file 123 is stored into the BY register 125, and the IY register 126 is simultaneously cleared to zero. The moving amounts $\Delta$x1, $\Delta$x2, $\Delta$x3 and $\Delta$x4 within the macroblock, read out of the IY register 126 and the register file 123 are calculated by an adder 124 and the result renews the address so as to rewrite the IY register 126. Also, after the address formation within the macroblock is completed, the address moving amounts $\Delta$x5 and $\Delta$x6 of the macroblocks, read out of the BY register 125 and the register file 123 are calculated in the adder 124 and the result is rewritten into the BY register 125. The outputs of the BY register 125 and the IY register 126 are sent to an adder 127 to output an addition result as an output address result.

By the above-described procedure, the address formation of the pixels can be performed, and by the instruction read out of the instruction memory 121 of the host processor 120, the address formation circuit is successively controlled.

In the above-described conventional address formation circuit, for every one address formation, the instruction output from the host processor 120 is required. This fact makes the processing load of the host processor 120 itself large. That is, when the address formation is realized by a software, the time is required for the instruction processing and sometimes it is too late for a high speed memory access such as a real time image processing. Also, the instruction processing time of a data fetch cycle, a decode cycle, an execution cycle and the like of the instruction of the host processor 120 is caused and thus it becomes hard to perform a synchronization of an address output timing. On the other hand, when the address calculation is carried out by a hardware, the processing time of the calculation can be quickened and on the contrary, the sequence of the hardware becomes complicated. Also, depending on the processing contents, a plurality kinds of exclusive address formation circuits are required and the increase of the circuit scale and the cost are brought about. Further, when the address calculation is completely realized by the software, the address calculation speed is further dropped than the software-hardware combined type.

SUMMARY OF THE INVENTION

It is therefore an object of the present invention to provide an address formation circuit for an image processing in view of the aforementioned problems of the prior art, which is capable of executing a parallel processing, realizing a synchronization of address formations, largely reducing a host processor control, and dealing with a plurality kinds of address patterns, and which does not require a particular purpose hardware for each address pattern to prevent increases of circuit scale and cost.

It is another object of the present invention to provide a method of generating an address for the image processing as above.

In accordance with one aspect of the present invention, there is provided an address formation circuit for an image processing for continuously executing a memory access into a rectangular area, comprising first address calculation means controllable by a program for calculating an address of one representative pixel in the rectangular area; and second address calculation means for successively forming addresses of a pixel unit within the rectangular area on the basis of the representative pixel.

The first address calculation means includes an instruction memory for storing the program for calculating a head address of the rectangular area; a data memory for storing address moving amounts required for the calculation of the head address of the rectangular area; a decoder for decoding instructions read out of the instruction memory; and a calculation processor for calculating the head address of the rectangular area on the basis of the address moving amounts, and the second address calculation means includes a data file memory for storing address moving amounts for forming an address pattern within the rectangular area on the basis of the calculation result of the first address calculation means; an adder for calculating the address moving amount read out of the data file memory and the head address read out of the data memory to obtain an output address; and a sequence controller for controlling the reading of the address moving amounts and the addition operation.

The calculation processor includes registers for storing the address moving amounts read out of the data memory; and an adder for calculating the head address of a next rectangular area by using the address moving amounts stored in the registers.

In accordance with another aspect of the present invention, there is provided a method of generating an address for an image processing for continuously executing a memory access into a rectangular area, comprising the steps of generating a start signal and a start address signal; calculating the head address of the rectangular area on the basis of the start address signal and the first address moving amounts in response to the start signal; calculating the second address moving amounts for forming an address pattern within the rectangular area on the basis of the head address of the rectangular area to obtain an output address.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 3:
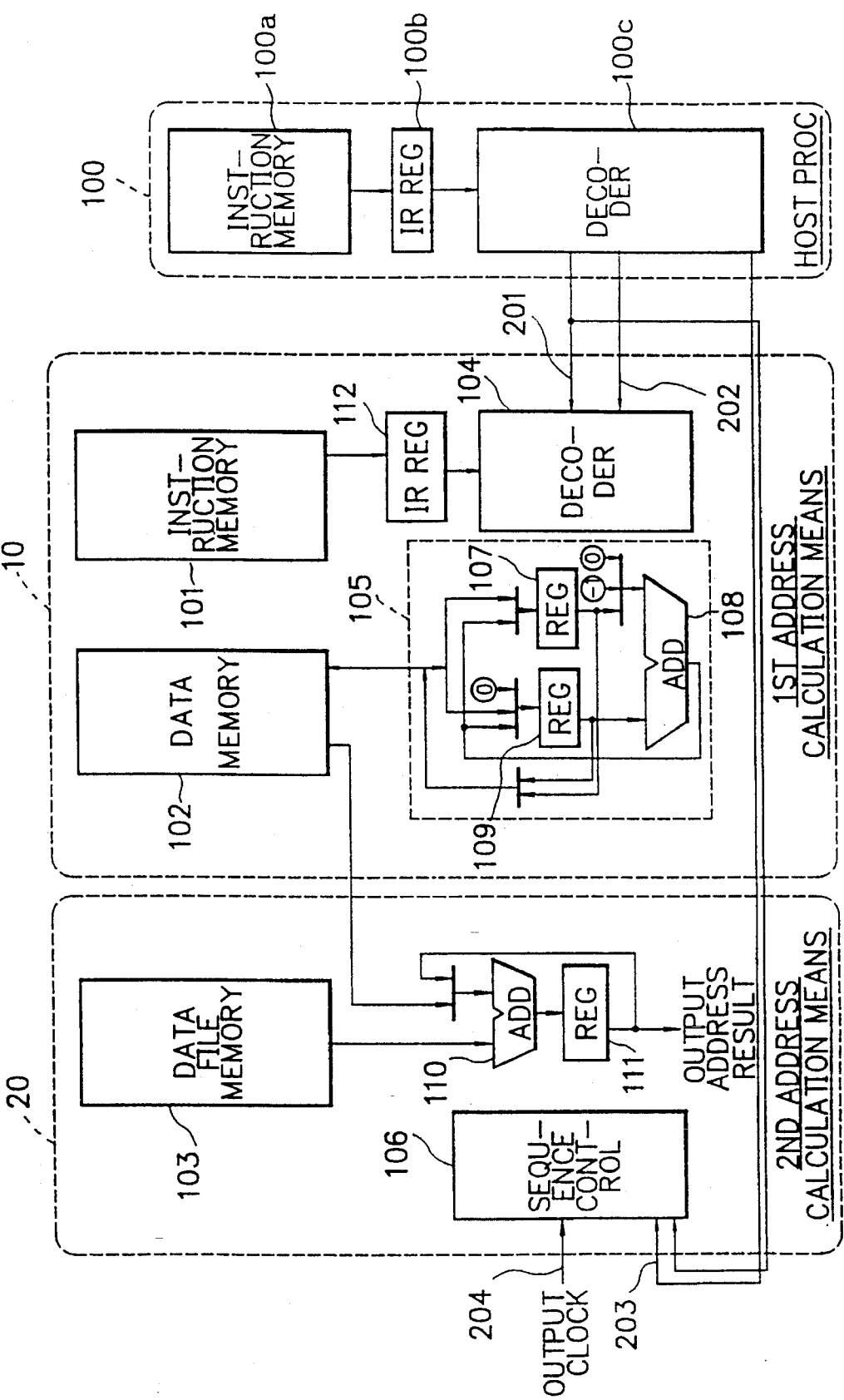
FIG. 3 is a block diagram of an address formation circuit for an image processing according to the present invention.

Referring now to the drawings, there is shown in FIG. 3 one embodiment of an address formation circuit for an image processing according to the present invention.

As shown in FIG. 3, the address formation circuit for an image processing is comprised of a first address calculation means 10 and a second address calculation means 20. The first address calculation means 10 includes an instruction memory 101, a data memory 102, a decoder 104, an IR register 112 and a calculation processor 105 which includes two registers 107 and 109 and one adder 108. The second address calculation means 20 includes a data file memory 103, a sequence controller 106, an address calculation adder 110 and a register 111. A host processor 100 includes an instruction memory 100a, an IR register 100b and a decoder 100c. The instruction memory 101 stores a program for calculating the head addresses of the macroblocks, and the data memory 102 stores the address moving amounts required for calculating the head addresses of the macroblocks and the calculation results. The instructions are consecutively read out of the instruction memory 101, and after the head addresses are calculated, the results are written into the data memory 102. The data file memory 103 stores the address moving amounts required for executing the address pattern formation within the macroblock on the basis of the calculation result obtained by the first address calculation means 10. In the second address calculation means 20, the sequence controller 106 controls the readout of the address moving amounts and the addition operation and successively performs the address formation within the macroblocks according to its sequence.

Now, a start signal 201 and a start address signal 202 for determining a start address of a program of the first address calculation means 10 are applied from the host processor 100 to the decoder 104 of the first address calculation means 10 and a pattern selection signal 203 of output addresses is also applied from the host processor 100 to the sequence controller 106 to start the address formation circuit for the image processing.

In the calculation processor 105 of the first address calculation means 10, according to the instruction, the address moving amounts of the macroblock are read out of the data memory 102 and are written into the registers 107 and 109. Then, the address moving amounts in the registers 107 and 109 are added in the adder 108 and the obtained head address of the next macroblock is stored into the data memory 102. The instructions read out of the instruction memory 101 are consecutively processed via the internal decoder 104. The processing contents of the instructions are (1) to read the moving amounts out of the data memory 102, (2) to read the previous calculation result out of the data memory 102, (3) to execute the addition operation of the registers 107 and 109, (4) to rewrite the calculation result into the data memory 102 and the like. These processings are controlled by the internal decoder 104 and hence the control covered by the host processor 100 is only to output the start signal 201, the start address signal 202 and the pattern selection signal 203 one time every processing of the macroblock at timings shown in FIG. 4.

Figure 5:
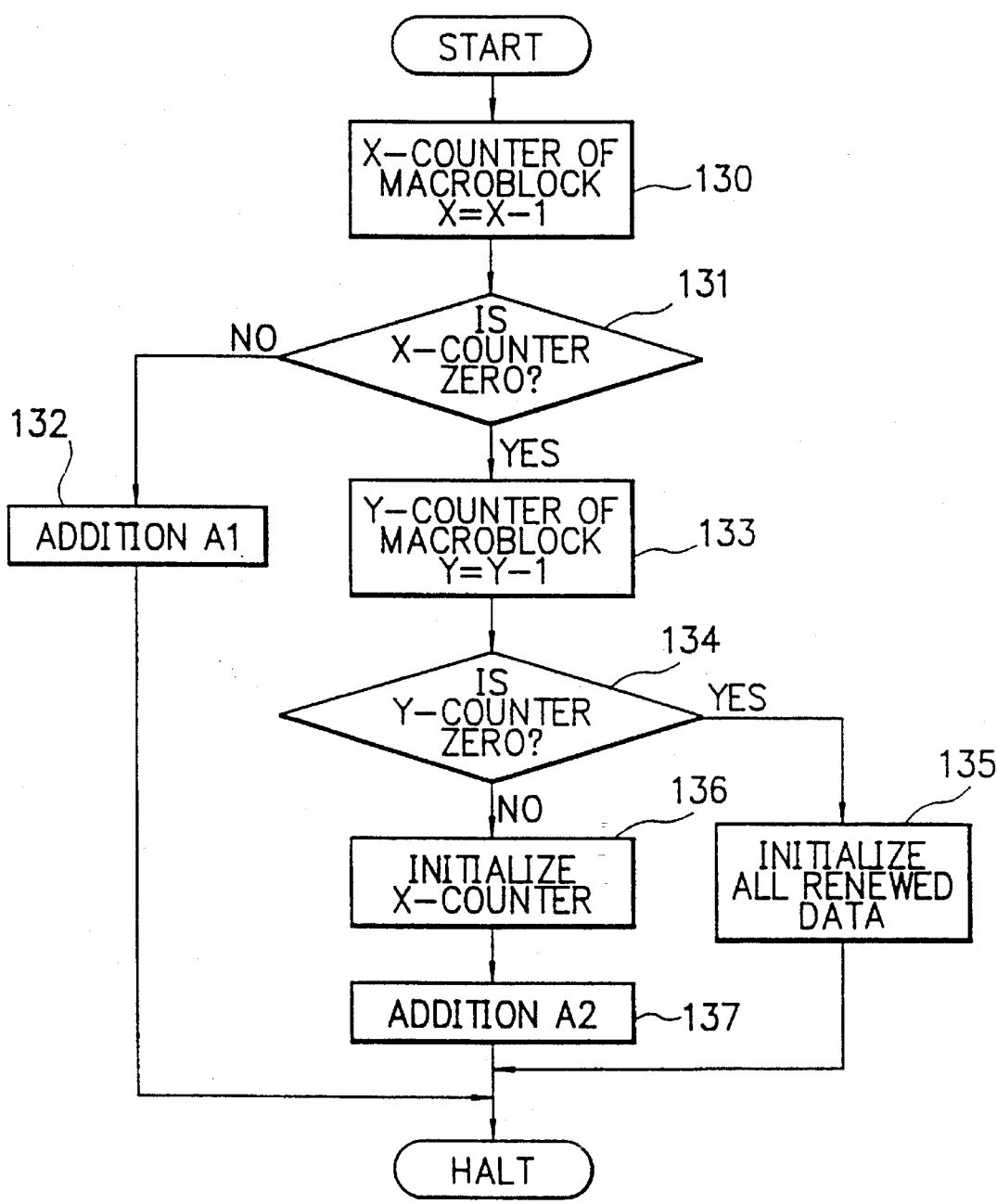
FIG. 5 is a flow chart of a processing program used in the circuit shown in FIG. 3.

Next, the control of the first address calculation means 10 will now be described with reference to the program flow chart shown in FIG. 5.

In this case, by using the processing repeat number, the head address moving amount, and the previous calculation result as parameters, the head address calculation of the next macroblock is executed. The calculation is started from the head address of the second macroblock, and by obtaining one head address, the parameters are renewed to stop the processing. The program waits until the next start signal 201 comes. As the repeat parameters, an X-counter for counting the addresses in the X- or right hand side direction of the macroblock and a Y-counter for counting the addresses in the Y- or lower side direction are provided in steps 130 and 133, respectively, and by zero discrimination of the X-counter and the Y-counter in respective steps 131 and 134, the situations are branched to execute one of the following three processings.

(1) When both the X-counter and the Y-counter are not zero, an addition A1 of the address moving amount $\Delta \times 5$ for moving to the adjacent right macroblock is executed in step 132 and the result is stored into the data memory 102 to stop the processing.

(2) When the X-counter is zero and the Y-counter is not zero, the X-counter is initialized in step 136 and an addition A2 of the address moving amount from the right end macroblock to one lower macroblock line of the left end macroblock is carried out and the result is stored into the data memory 102 to stop the processing.

(3) When both X-counter and the Y-counter are zero, all renewed data are initialized in step 135 to await a next input.

Figure 6:
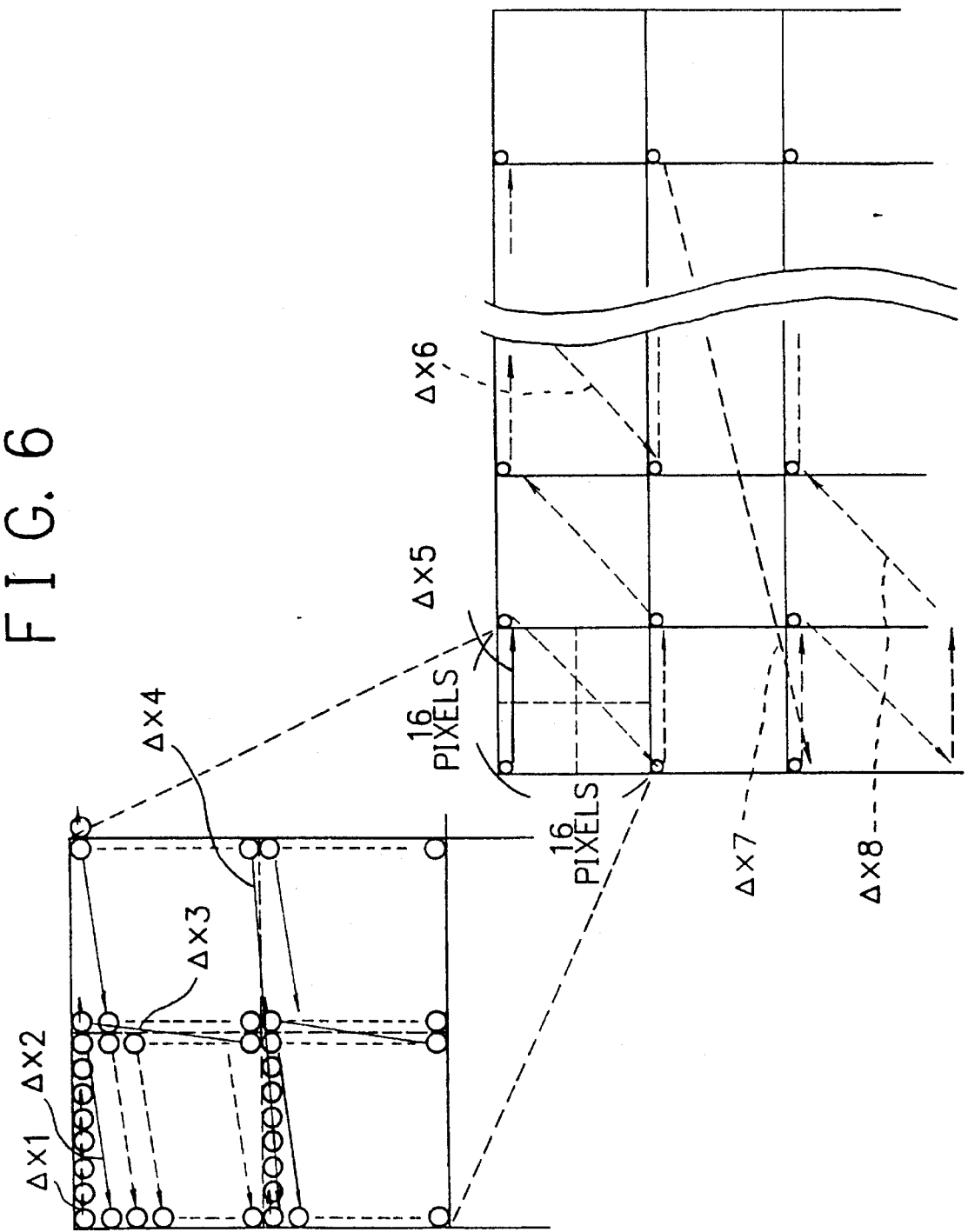
FIGS. 6 to 8 are schematic diagrams showing address patterns used in the circuit shown in FIG. 3.
Figure 7:
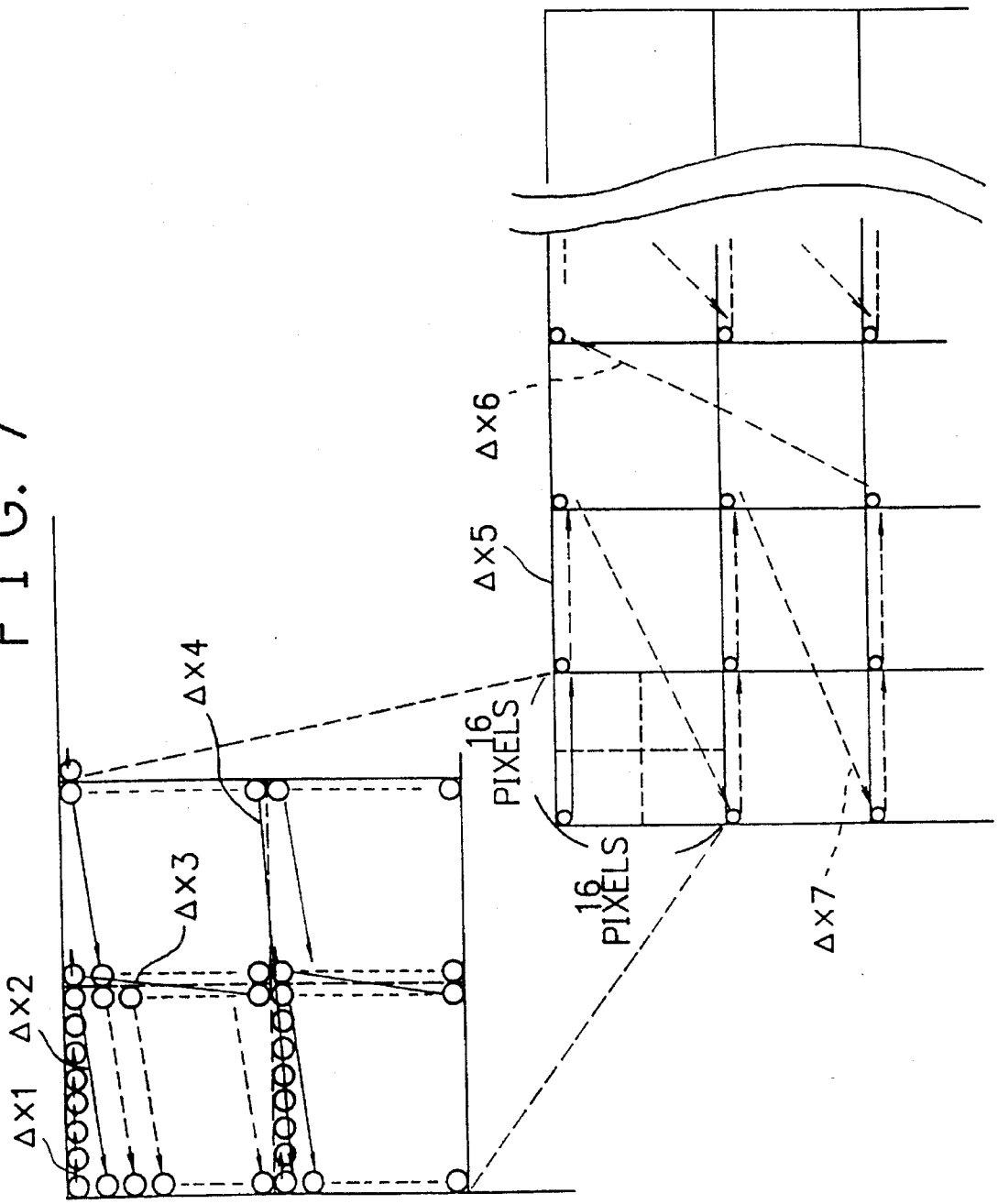
Figure 8:
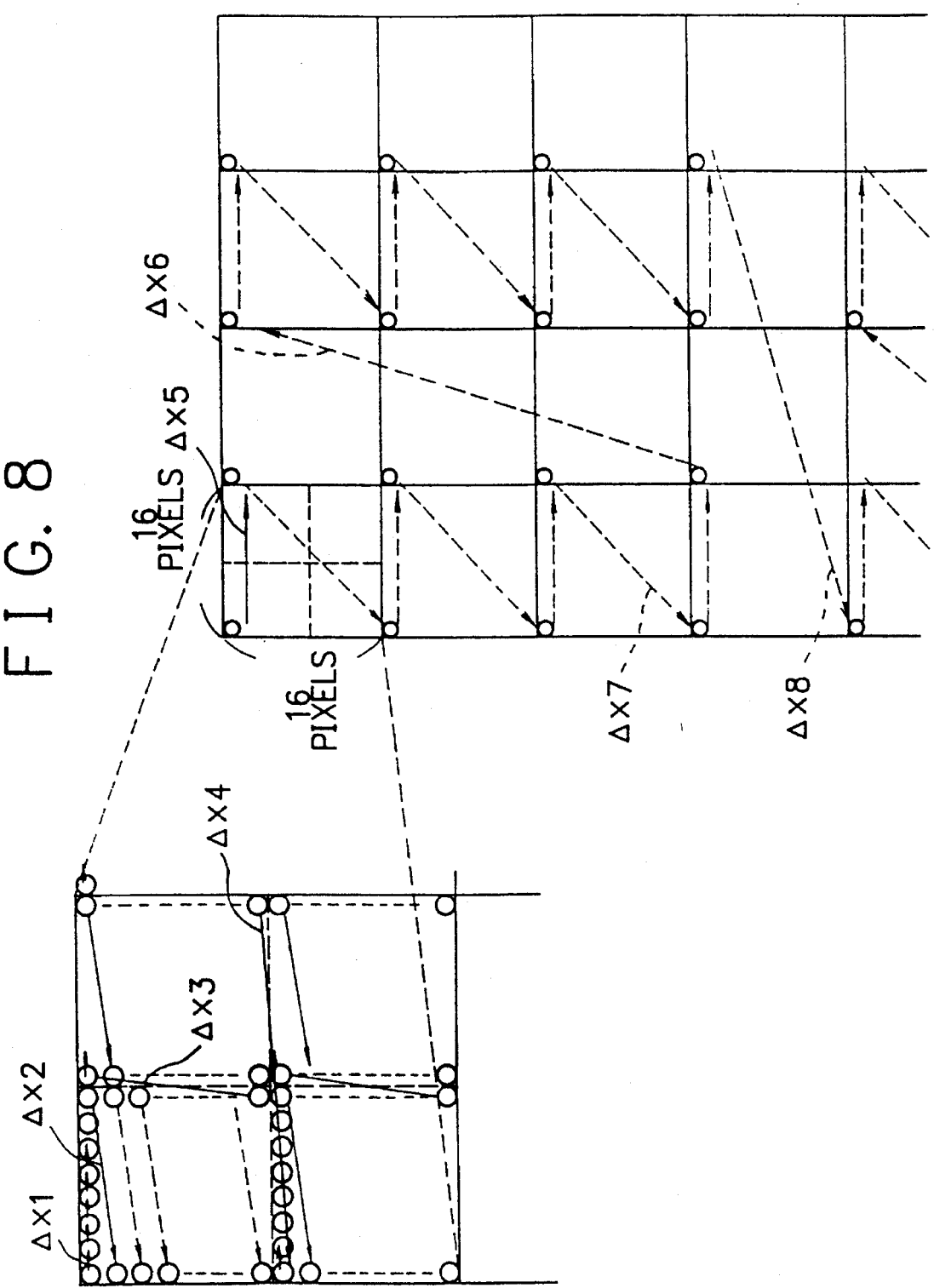

A plurality of processing programs as described above for a plurality of modules are stored in the instruction memory 101. The start address signal 202 is decoded and the corresponding address is set into a program counter. Accordingly, a plurality kinds of moving patterns of a macroblock unit can be realized for a plurality of modules. In FIGS. 6, 7 and 8, there are shown examples of a plurality kinds of moving patterns of the macroblock unit.

Figure 1:
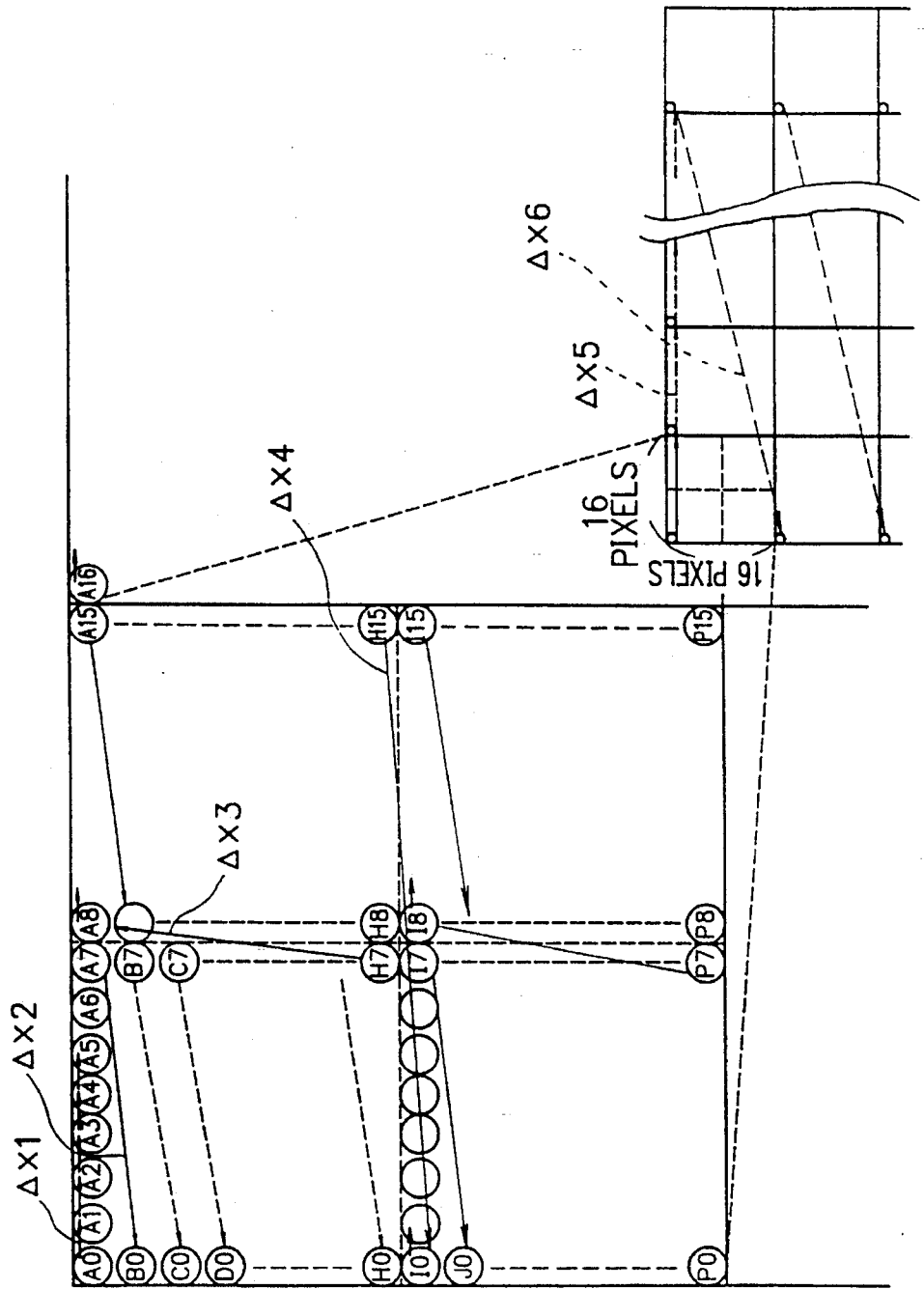
FIG. 1 is a schematic diagram showing a conventional address pattern of a rectangular area.
Figure 2:
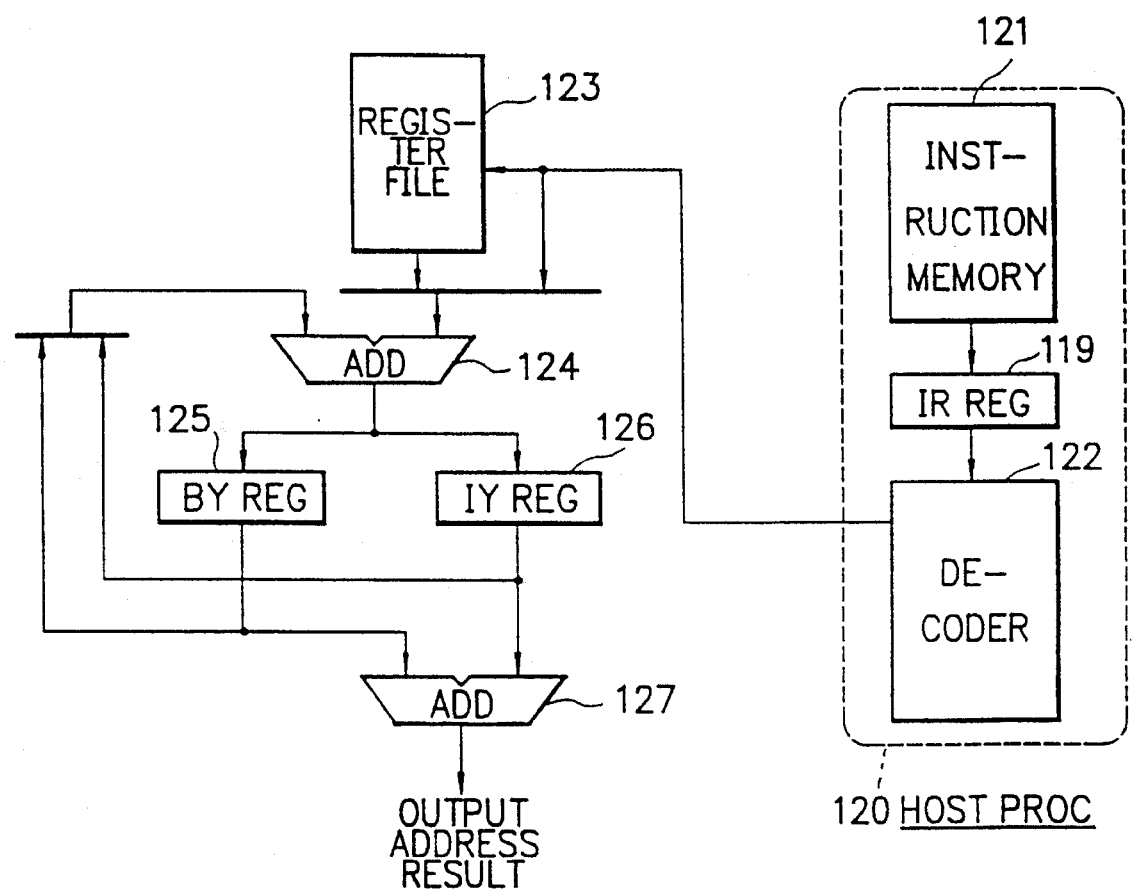
FIG. 2 is a block diagram of a conventional address formation circuit for an image processing.

Within one clock period of an output clock 204, the address moving amounts within the macroblock and the head address of the macroblock are read out of the data file memory 103 and the data memory 102, respectively, and the readout values are added in the adder 110 to determine the output address. The address calculation result stored in the register 111 is fed back again to the adder 110, and by the addition of the address moving amounts read out of the data file memory 103, the output address can be formed. This moving amount readout pattern is controlled by the sequence controller 106 in accordance with the address pattern within the macroblock, as shown in FIG. 1. The sequence controller 106 controls the addresses to be designated and its number of times, its timings, and the latch timing of the register 111, and the timing of the address output depends on the external output clock 204. The start signal 201 is also input to the second address calculation means 20, and thus the second address calculation means 20 starts the processing at the same time as the first address calculation means 10. By reading the address moving amounts within the macroblock out of the data file memory 103, the address formation can be performed in synchronism with the output clock 204. In the second address calculation means 20, not by the control by the instruction but by the existent sequence, the address of the address moving amount to be read out is changed in synchronism with the output clock 204 in order to change the moving amount to be read out. Hence, in the address formation, one address can be output within one clock period of the output clock 204. In this case, a plurality kinds of patterns to be read out of the data file memory 103 are supported and are pursuant to the moving patterns within the macroblock of the CCITT recommendation H.261 as a multimedia standard, the MPEG and the like.

Figure 4:
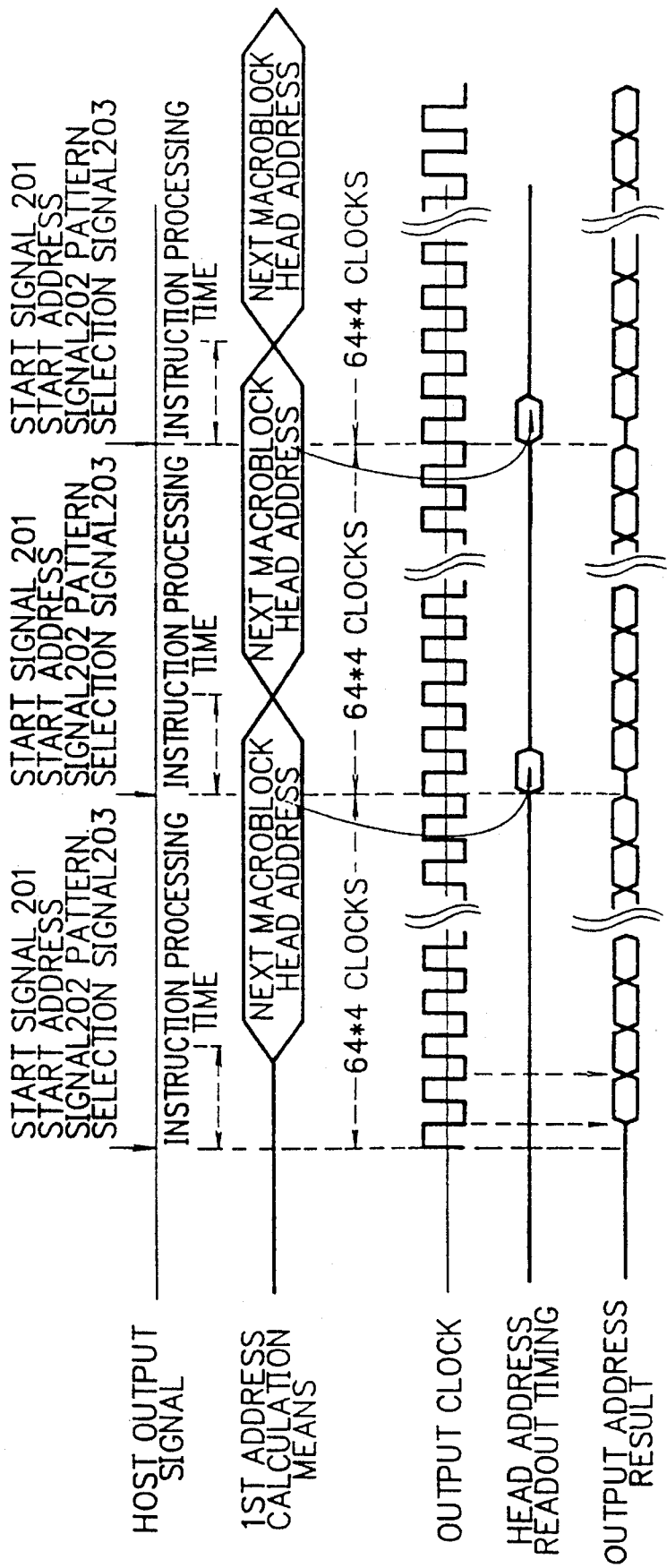
FIG. 4 is a timing chart for explaining an operation of the circuit shown in FIG. 3.

The first address calculation means 10 and the second address calculation means 20 can be processed in parallel like a pipeline, as shown in FIG. 4. It takes 64 clocks×4 blocks=256 clocks for the address formation within the macroblock of the second address calculation means 20, and during this formation period (256 clocks), the heading address of the next macroblock is calculated in the first address calculation means 10. By this parallel processing, the delay of the address output timing due to the internal processing time of the instruction of the first address calculation means 10 can be avoided. Further, only giving an external control signal, the entire of the processing procedure can be controlled by oneself. Thus, it is not necessary to control the address formation by the host processor and it can also be constructed by a sequencer for controlling timings of control signals.

As described above, according to the present invention, by dividing the address formation procedure into two processing parts, the first address calculation means for the address calculation of every macroblock and the second address calculation means for the address formation part within the macroblock can be processed in parallel like the pipeline by the independent sequences. Accordingly, one address can be output per one clock to enable the synchronization of the address formation. The control of the host of the macroblock unit can be carried out by only outputting three kinds of drive signals only one time to the macroblock with the result of large reduction of the host control. Further, the address formation of a plurality kinds of macroblocks is calculated by using an exclusive microcomputer, and thus an adaptability like a software is provided to deal with a plurality kinds of address patterns. Simultaneously, there is no need to provide a particular exclusive hardware for the address patterns and hence the increase of the circuit scale and cost can not be invited.

Further, a high speed memory access like a real time image processing in the address formation can be possible and, when a complicated address pattern is required, an overhead of the address formation time in the instruction processing can be prevented.

While the present invention has been described with reference to the particular illustrative embodiment, it is not to be restricted by this embodiment but only by the appended claims. It is to be appreciated that those skilled in the art can change or modify the embodiment without departing from the scope and spirit of the present invention.

What is claimed is:

1. An address calculation system for sequentially calculating respective addresses of a plurality of memory elements in an area, the area being divided into a plurality of rectangular macroblocks, each macroblock containing a set of memory elements and being divided into a plurality of blocks, each block containing a subset of the memory elements, the system comprising:

a host processor outputting a start address signal, a start signal and a pattern selection signal, the start address signal identifying a head address of a starting macroblock, the start signal containing a set of starting conditions for use in calculating head addresses of the macroblocks according to a selected pattern relative to the head address of the starting macroblock, and the pattern selection signal identifying an intra-macroblock pattern for use in addressing each of the memory elements in one of said macroblocks;

intra-macroblock calculation means for calculating memory element addresses within one of said macroblocks according to the intra-macroblock pattern in synchronism with a sequence of clock signals supplied by a clock supply means; and head address calculation means for calculating a head address of a subsequent macroblock in accordance with the pattern identified in the start signal in parallel with the operation of the intra-macroblock calculation means, such that the head address of the subsequent macroblock is calculated prior to completion of the intra-macroblock pattern.

2. The address calculation system as claimed in claim 1, wherein the head address calculation means includes:

an instruction memory for storing a program for calculating the head address of the subsequent macroblock;

a data memory for storing the head address of the subsequent macroblock and predetermined increments of the macroblock pattern required for the calculation of the head address of the subsequent macroblock;

a decoder for decoding instructions of the program from the instruction memory; and a calculation processor for calculating the head address of the subsequent macroblock in accordance with the program, and wherein the intra-macroblock calculation means includes:

a data file memory for storing predetermined increments of the intra-macroblock pattern;

a first adder for calculating an output address from the predetermined increments read out of the data file memory and the head address read out of the data memory; and a sequence controller for controlling the reading of the predetermined increments and the first adder.

3. The address calculation system as claimed in claim 2, wherein the calculation processor includes:

registers for storing the predetermined increments read out of the data memory; and a second adder for calculating the head address of a next rectangular area by using the predetermined increments stored in the registers.

4. An address calculation method for sequentially calculating respective addresses of a plurality of memory elements to be sequentially accessed, the memory elements being located in a rectangular area divided into a plurality of macroblocks each having a head address therein, comprising the steps of:

providing a start instruction for instructing a set of starting conditions for calculating the head addresses of the macroblocks according to a sequence of a head address access pattern to access the head addresses of macroblocks other than an initial macroblock relative to the head address of the initial macroblock designated by the start instruction, a pattern selection signal representing an intra-macroblock access pattern to cause intra-macroblock access from the head address of a given macroblock to memory elements within the given macroblock, and a sequence of clock signals:

responding to the start instruction to execute a set of programmed instructions for head address calculation synchronously with the sequence of clock signals so that, at a current clock signal, the head address of a subsequent macroblock to a current macroblock is calculated; and responding to the pattern selection signal to calculate corresponding addresses for memory elements located in the current macroblock according to the intra-macroblock access pattern synchronously with the sequence of clock signals so that at each clock pulse one of the corresponding addresses is calculated.

5. The method as claimed in claim 4, wherein the calculation of the head address of the subsequent macroblock includes the substeps of:

storing predetermined increments of the macroblock pattern and the head address of the initial macroblock; and calculating the head address of a next macroblock by adding the predetermined increments of the macroblock pattern to the head address of the initial macroblock.

* * * * *